US012366208B2

United States Patent
Baddam et al.

(10) Patent No.: US 12,366,208 B2
(45) Date of Patent: Jul. 22, 2025

(54) TURBINE ENGINE INCLUDING AN ENGINE STARTER ASSEMBLY

(71) Applicant: Unison Industries, LLC, Jacksonville, FL (US)

(72) Inventors: Nagendra Baddam, Bengaluru (IN); Shiloh Montegomery Meyers, Miamisburg, OH (US); Brian Christopher Kemp, Troy, OH (US); David Raju Yamarthi, Bengaluru (IN); Venkata Subramanya Sarma Devarakonda, Bengaluru (IN); David Allan Dranschack, Dayton, OH (US); Narendra Dev Mahadevaiah, Bengaluru (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/360,935

(22) Filed: Jul. 28, 2023

(65) Prior Publication Data

US 2025/0035048 A1 Jan. 30, 2025

(51) Int. Cl.
*F02C 7/277* (2006.01)
*F02C 7/12* (2006.01)
*F02C 7/32* (2006.01)

(52) U.S. Cl.
CPC ............... *F02C 7/277* (2013.01); *F02C 7/12* (2013.01); *F02C 7/32* (2013.01); *F05D 2260/85* (2013.01)

(58) Field of Classification Search
CPC ............... F02C 7/277; F02C 7/12; F02C 7/32
See application file for complete search history.

(56) References Cited

U.S. PATENT DOCUMENTS

| | | | |
|---|---|---|---|
| 9,664,070 B1 * | 5/2017 | Clauson | F02C 7/277 |
| 10,040,577 B2 | 8/2018 | Teicholz et al. | |
| 10,508,567 B2 | 12/2019 | Stachowiak et al. | |
| 10,539,079 B2 | 1/2020 | Schwarz et al. | |
| 10,578,025 B2 * | 3/2020 | Jensen | B64D 41/00 |
| 10,781,754 B2 | 9/2020 | Chiasson et al. | |
| 10,787,933 B2 | 9/2020 | Clauson et al. | |
| 11,486,310 B2 | 11/2022 | Tomescu | |
| 2014/0373554 A1 * | 12/2014 | Pech | F02C 7/277 60/788 |
| 2016/0348588 A1 * | 12/2016 | Ross | F02C 7/12 |
| 2017/0234167 A1 * | 8/2017 | Stachowiak | F01D 21/00 416/1 |
| 2017/0234232 A1 * | 8/2017 | Sheridan | F02C 7/32 307/9.1 |
| 2017/0234235 A1 | 8/2017 | Pech | |

(Continued)

FOREIGN PATENT DOCUMENTS

| | | | | |
|---|---|---|---|---|
| EP | 3205848 A1 * | 8/2017 | ............ | F01D 21/00 |
| EP | 3318726 A1 * | 5/2018 | ............ | F01D 17/06 |

(Continued)

*Primary Examiner* — Craig Kim
(74) *Attorney, Agent, or Firm* — McGarry Bair PC (57) ABSTRACT

A method and system used to control a rotational speed or a torque of an output drive shaft. The output drive shaft being coupled to a turbine engine. The turbine engine including an engine core and an engine starter assembly. The engine starter assembly including an air turbine starter, an output drive shaft and an electric motor.

20 Claims, 4 Drawing Sheets

(56) References Cited

U.S. PATENT DOCUMENTS

| | | | |
|---|---|---|---|
| 2018/0022464 A1* | 1/2018 | Gelwan | F01D 13/00 |
| | | | 701/100 |
| 2018/0022465 A1* | 1/2018 | Gelwan | F02C 9/18 |
| | | | 60/778 |
| 2018/0030900 A1 | 2/2018 | Mathis | |
| 2018/0100438 A1* | 4/2018 | Kemp | B64D 27/10 |
| 2018/0216537 A1* | 8/2018 | Greenberg | F02C 9/18 |
| 2018/0223740 A1* | 8/2018 | Forest | F02C 7/268 |
| 2018/0230946 A1* | 8/2018 | Virtue, Jr. | F02C 7/26 |
| 2018/0340475 A1 | 11/2018 | Grigorov | |
| 2019/0128141 A1* | 5/2019 | Pech | F02C 7/277 |
| 2019/0218975 A1 | 7/2019 | Pech | |
| 2019/0226405 A1* | 7/2019 | Kelly | F01D 25/34 |
| 2019/0383220 A1* | 12/2019 | Mackin | F02C 7/277 |
| 2020/0123980 A1* | 4/2020 | Kusnierek | F01D 15/12 |
| 2020/0123982 A1* | 4/2020 | Kusnierek | F01D 15/10 |
| 2021/0062720 A1* | 3/2021 | Kempers | F02C 7/275 |
| 2022/0298971 A1 | 9/2022 | Antonio et al. | |
| 2024/0218810 A1* | 7/2024 | Aktir | F01D 25/04 |

FOREIGN PATENT DOCUMENTS

| | | | | |
|---|---|---|---|---|
| EP | 3406864 | A1 | 11/2018 | |
| EP | 3587746 | A1 * | 1/2020 | F01D 17/145 |
| EP | 3640455 | A1 | 4/2020 | |
| EP | 3683425 | A1 * | 7/2020 | F01D 25/34 |
| EP | 3922828 | A1 * | 12/2021 | F01D 19/00 |
| EP | 4306785 | A1 * | 1/2024 | F01D 17/145 |

* cited by examiner

TURBINE ENGINE INCLUDING AN ENGINE STARTER ASSEMBLY

TECHNICAL FIELD

The disclosure generally relates to an engine starter assembly for a turbine engine, and more specifically to an engine starter assembly including an air turbine starter.

BACKGROUND

A turbine engine, for example a gas turbine engine, utilizes an air turbine starter (ATS) during startup of the turbine engine. The ATS is often mounted near the turbine engine and the ATS can be coupled to a high-pressure fluid source, such as compressed air, which impinges upon a turbine rotor in the ATS causing it to rotate at a relatively high rate of speed. The ATS includes an output drive shaft that is driven by the turbine rotor, typically through a reducing gear box, where the output drive shaft provides rotational energy to a rotatable element of the turbine engine (e.g., the crankshaft or the rotatable shaft) to begin rotating. The rotation by the ATS continues until the turbine engine attains a self-sustaining operating rotational speed.

BRIEF DESCRIPTION OF THE DRAWINGS

A full and enabling disclosure of the present subject matter, including the best mode thereof, directed to one of ordinary skill in the art, is set forth in the specification, which makes reference to the appended FIGS., in which.

DETAILED DESCRIPTION

Aspects of the present disclosure are directed to an engine starter assembly for a turbine engine. The engine starter assembly can include an air turbine starter, an electric motor and an output drive shaft. The electric motor can be couplable to at least one of the air turbine starter or the output drive shaft.

The electric motor is used to at least partially drive at least one of the air turbine starter (ATS) or the output drive shaft. The electric motor can be used to augment or otherwise supplemental the ATS (e.g. drive the output drive shaft in conjunction with the ATS) or otherwise be used to drive the output drive shaft alone. It is contemplated that the electric motor can be used to drive the output drive shaft based at least partially on sensed parameters of the output drive shaft or the turbine engine. As a non-limiting example, the electric motor can be used based at least partially on a torque of the output drive shaft, a rotational speed of the output drive shaft or a temperature of the turbine engine. For purposes of illustration, the present disclosure will be described with respect to an engine starter assembly for a turbine engine. It will be understood, however, that aspects of the disclosure described herein are not so limited and can have general applicability for other engines or other turbine engines. For example, the disclosure can have applicability for an engine starter assembly used with any suitable engine or within any suitable vehicle, and can be used to provide benefits in industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction extending towards or away from a common center. For example, in the overall context of a turbine engine, radial refers to a direction along a ray extending between a center longitudinal axis of the turbine engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, fastened, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

Figure 1:
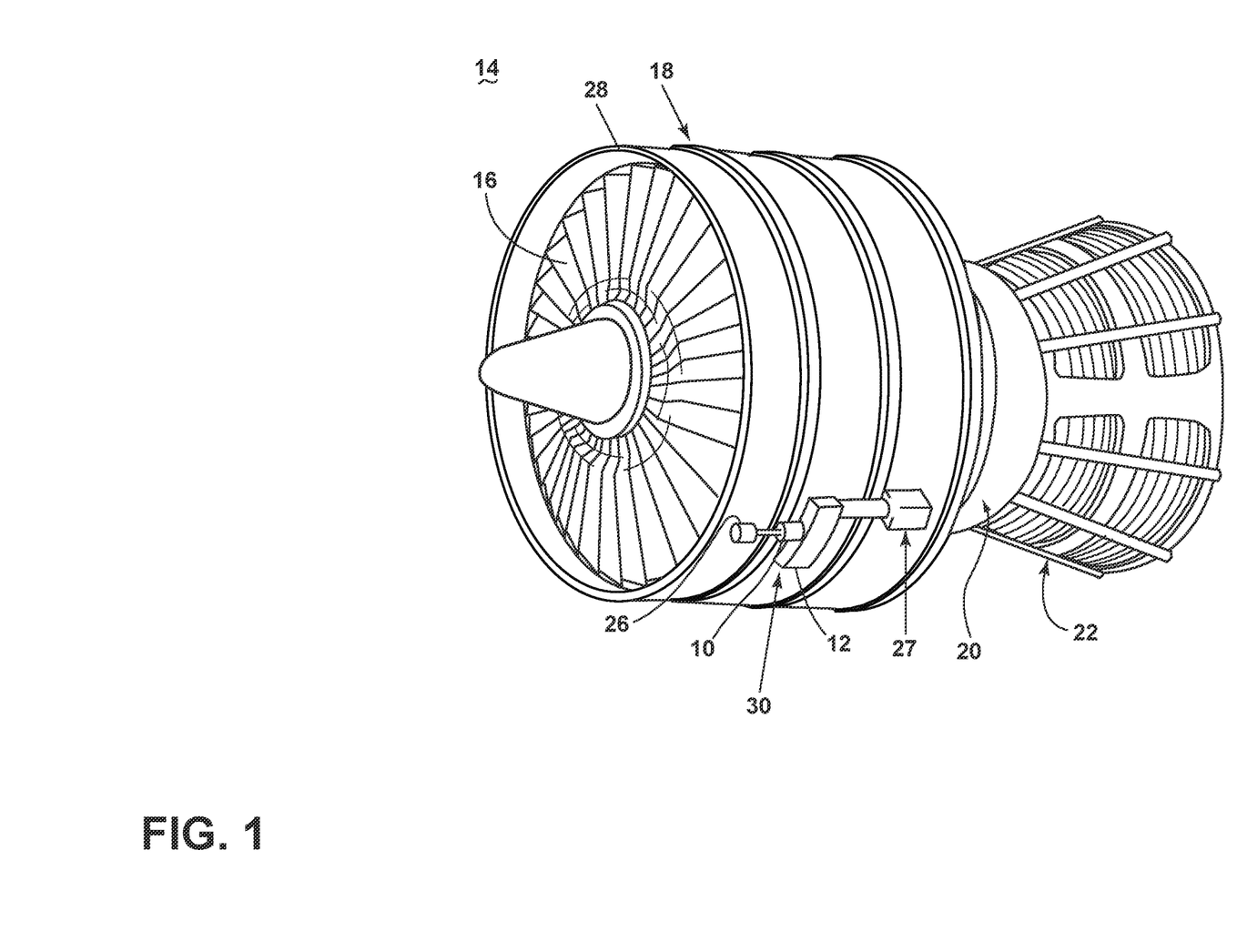
FIG. 1 is a schematic illustration of a turbine engine with an engine starter assembly having an air turbine starter and an electric motor, in accordance with various aspects described herein.

FIG. 1 is a schematic perspective view of an engine starter assembly 30 for a turbine engine 14. The engine starter assembly 30 can include an air turbine starter (ATS) 10 and an electric motor 26. The ATS 10 is coupled to an accessory gear box (AGB) 12, also known as a transmission housing.

The turbine engine 14 can include in serial flow arrangement a fan section including a fan section 16, a compression section 18, a combustion section 20, and a turbine section 22. The fan section 16 can be at least partially encased by a fan casing 28 or otherwise by a nacelle or casing of the turbine engine 14. As a non-limiting example, the compression section 18 can include a low-pressure (LP) compressor region and a high-pressure (HP) compressor region. As a non-limiting example, the turbine section 22 can include an LP turbine region and an HP turbine region. The fan section 16, the compression section 18, the combustion section 20, and the turbine section 22 can, together, form an engine core of the turbine engine 14. The turbine engine 14 can include other components not illustrated. As a non-limiting example, the turbine section 22 can drive an engine drive shaft that drives at least a portion of the compression section 18 and/or the fan section 16.

The AGB 12, the ATS 10, and the electric motor 26 are schematically illustrated as being mounted to a respective portion of the turbine engine 14. At least a portion of the engine starter assembly 30 can be located radially outside of a fan casing 28. That is, the engine starter assembly 30 can be located radially outside of the fan section 16 including the fan. Alternatively, it is contemplated that in a differing and non-limiting example, at least a portion of the engine starter assembly 30 can be located outside of the core near the compression section 18, specifically the HP compressor region, where the engine starter assembly 30 can be coupled to a transfer gear box (not shown) or an accessory gear box (not shown). Further, any location for the engine starter assembly 30 is contemplated where the ATS 10 can be coupled to the turbine engine 14. As a non-limiting example, at least a portion of the engine starter assembly 30 can be provided along or within the fan casing 28, nacelle or casing of the turbine engine 14. As a non-limiting example, at least a portion of the engine starter assembly 30 can be provided within the engine core. As a non-limiting example, the electric motor 26 can be provided within a portion of the engine core (e.g., formed with a portion of the engine drive shaft).

The AGB 12 can be coupled to the turbine engine 14 at a portion of the turbine section 22 by way of a mechanical power take-off 27. The mechanical power take-off 27 contains multiple gears and means for mechanical coupling of the AGB 12 to the turbine engine 14.

During operation of the turbine engine 14, the fan section 16 intakes a flow of air. The flow of air is supplied to the compression section 18 where it is subsequently compressed and fed to the combustion section to define a compressed air flow. The compressed air flow is then combusted within the combustion section 20 and fed to the turbine section 22 as a combustion gas flow. The combustion gas flow then drives the turbine section 22, which subsequently drives the compression section 18 and the fan section 16.

At least a portion of the engine starter assembly 30 (e.g., the electric motor 26 and/or the ATS 10) can at least partially drive the engine drive shaft. As a non-limiting example, the engine starter assembly 30 can be used during startup of the turbine engine 14. The engine starter assembly 30 can be used to drive the engine drive shaft, which can rotate the fan section 16 to draw air into the turbine engine 14, where it is subsequently compressed and combusted.

Figure 2:
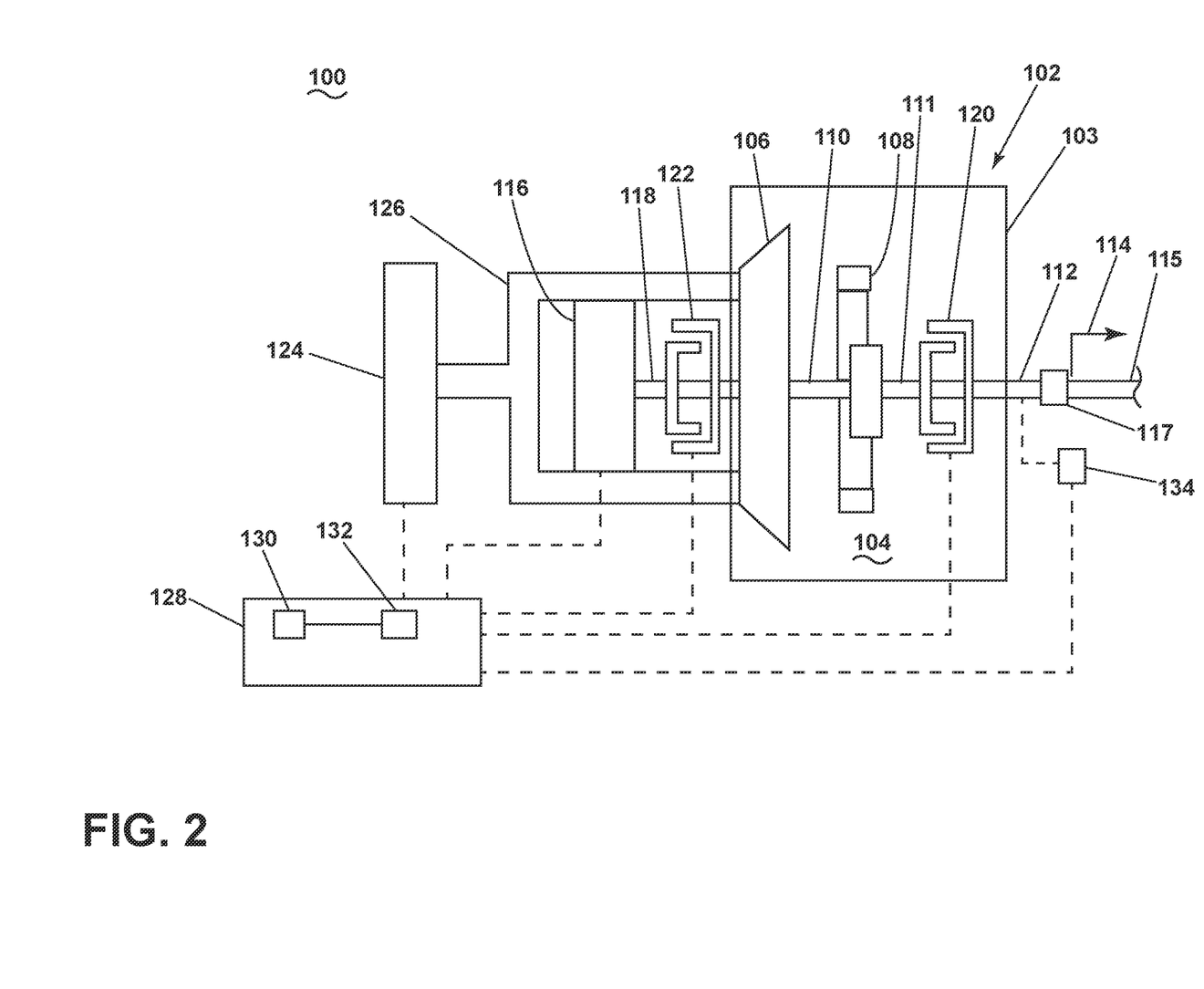
FIG. 2 is a schematic block diagram of an engine starter assembly suitable for use as the engine starter assembly of FIG. 1, the engine starter assembly including the electric motor and the air turbine starter couplable to an output drive shaft.

FIG. 2 is a schematic block diagram of an engine starter assembly 100 suitable for use as the engine starter assembly 30 of FIG. 1. The engine starter assembly 100 includes an ATS 102, an output drive shaft 112, and an electric motor 116.

The ATS 102 can include a housing 103 defining an interior 104. A rotatable turbine 106 can be provided within the interior 104. The rotatable turbine 106 can be a set of circumferentially spaced airfoils. A turbine drive shaft 110 can be coupled to the rotatable turbine 106. The turbine drive shaft 110 can be at least partially rotationally driven by the rotation of the rotatable turbine 106. As used herein, the term drive or iterations thereof refers to the transfer of work between two elements. An output gear assembly 108 is provided within the interior 104 and coupled to the turbine drive shaft 110. The output gear assembly 108 can include a set of gears. The turbine drive shaft 110 can define an input to the output gear assembly 108. An ATS output shaft 111 can be coupled to the output gear assembly 108 and define an output of the output gear assembly 108. A first clutch 120 can selectively operably couple the ATS output shaft 111 to the output drive shaft 112. Alternatively, the ATS output shaft 111 can define a portion or otherwise be integrally formed with the output drive shaft 112. The output gear assembly 108 can create a gear ratio change (e.g., a gear reduction) between the turbine drive shaft 110 and the ATS output shaft 111 such that the first drive shaft can rotate at a different rotational velocity than the ATS output shaft 111.

The engine starter assembly 100 can further include a starter air valve (SAV) 124 fluidly coupled to a fluid duct 126. The fluid duct 126 can be coupled to the ATS 102, specifically the rotatable turbine 106 of the ATS 102. A flow of fluid (e.g., air) can be selectively supplied to the ATS 102 through the fluid duct 126. The flow of air can flow over a respective portion of the rotatable turbine 106. The rotatable turbine 106 can extract a work from the flow of air and subsequently drive the turbine drive shaft 110.

The electric motor 116 can be coupled to an electric motor output shaft 118. The electrical motor 116 can be used to drive the electric motor output shaft 118. The electric motor output shaft 118 can be operably coupled to the ATS 102 such that the electric motor 116 can be used to at least partially drive the ATS 102. The electric motor 116 can be provided in the interior 104 or exterior the ATS 102. A second clutch 122 can selectively couple the electric motor output shaft 118 to the turbine drive shaft 110. Alternatively, the electric motor output shaft 118 can be integrally formed with the turbine drive shaft 110.

While illustrated as being coupled to the ATS 102, it is contemplated that the electric motor 116 can be couplable directly to the output drive shaft 112. As such, the electric motor 116 can be used to at least partially drive the ATS 102 and/or the output drive shaft 112. The electric motor output shaft 118 can be directly couplable to or integrally formed with the output drive shaft 112.

The electric motor 116 can be any suitable electric motor 116. As a non-limiting example, the electric motor 116 can be a direct current or alternating current electric motor. As a non-limiting example, the electric motor 116 can be a motor including a rotor and a stator. The rotor can include a plurality of windings that are supplied a flow of current. The current can subsequently generate an electric field which can ultimately cause the rotation of the rotor. The rotor of the electric motor 116 can be coupled to the electric motor output shaft 118 to define an output of the electric motor 116. The electric motor 116 can include a power source (not illustrated) that at least partially drives the electric motor. As a non-limiting example, the power source can be a battery or a solar cell.

The output drive shaft 112 can be selectively operably couplable to a respective portion of an engine 114 (e.g. the turbine engine 14 of FIG. 1). As a non-limiting example, the output drive shaft 112 is selectively operably couplable to an engine drive shaft 115 of the engine 114. A coupling point 117 can be provided between the output drive shaft 112 and the engine drive shaft 115. As a non-limiting example, the coupling point 117 can be a permanent, physical coupling between the engine drive shaft 115 and the output drive shaft 112. As a non-limiting example, the engine drive shaft 115 and the output drive shaft 112 can be integrally formed, and the coupling point 117 can denote a location where the output drive shaft 112 enters the engine 114. In the case of the engine drive shaft 115 and the output drive shaft 112 being integrally formed, the engine starter assembly 100 is selectively operably couplable to the engine drive shaft 115 through the selective engagement of the first clutch 120. As a non-limiting example, the coupling point 117 can be a clutch, an AGB (e.g., the AGB 12 of FIG. 1), a decoupler, or any combination thereof.

A controller module 128 can be used to selectively, operably control certain portions of the engine starter assembly 100. As a non-limiting example, the controller module 128 can be used to selectively, operably control the ATS 102 and the electric motor 116. The controller module 128 can include a processor 130 and a memory 132 can be communicatively coupled to respective portions of the engine starter assembly 100. The memory 132 can be defined as an internal storage for various aspects of the engine starter assembly 100. For example, the memory 132 can store code, executable instructions, commands, instructions, authorization keys, specialized data keys, passwords, or the like. The memory 132 can be RAM, ROM, flash memory, or one or more different types of portable electronic memory, such as discs, DVDs, CD-ROMs, etc., or any suitable combination of these types of memory. The processor 130 can be defined as a portion of the controller module 128 which can receive an input, perform calculations, and output executable data. The processor 130 can be a microprocessor.

The controller module 128 can be communicatively coupled to various portions of the engine starter assembly 100 or the engine 114. As a non-limiting example, the controller module 128 can be communicatively coupled to the electric motor 116, the first clutch 120, the second clutch 122 and the SAV 124. The controller module 128 can further receive an input from any suitable portion of the engine starter assembly 100 or the engine 114. As a non-limiting example, the engine starter assembly 100 can include a set of sensors 134 coupled to a respective portion of the engine starter assembly 100 or the engine 114. As a non-limiting example, the set of sensors 134 can be coupled to the output drive shaft 112, or any other suitable portion of the engine starter assembly 100, or the engine 114 to monitor the function of the respective portion of the engine starter assembly 100 or the engine 114 (e.g. the engine core of the turbine engine 14 of FIG. 1), respectively. As a non-limiting example, the set of sensors 134 can include a torque sensor or a rotational speed sensor that can measure the torque or rotational speed, respectively, of the output drive shaft 112. As a non-limiting example, the set of sensors 134 can include a temperature sensor that can measure a temperature of at least a portion of the engine or otherwise an average temperature of the engine. As a non-limiting example, the engine 114 can be the turbine engine 14 of FIG. 1, and the temperature sensors can be used to measure at least one temperature or an average temperature of the engine core. The set of sensors 134 can output a signal to the controller module 128, with the signal being indicative of at least one of the rotational speed or torque of the output drive shaft, or a temperature of the engine core. It will be appreciated that the input or signal from the set of sensors 134 can be used to operate at least one of the electric motor 116 or the ATS 102, through the SAV 124.

Figure 3:
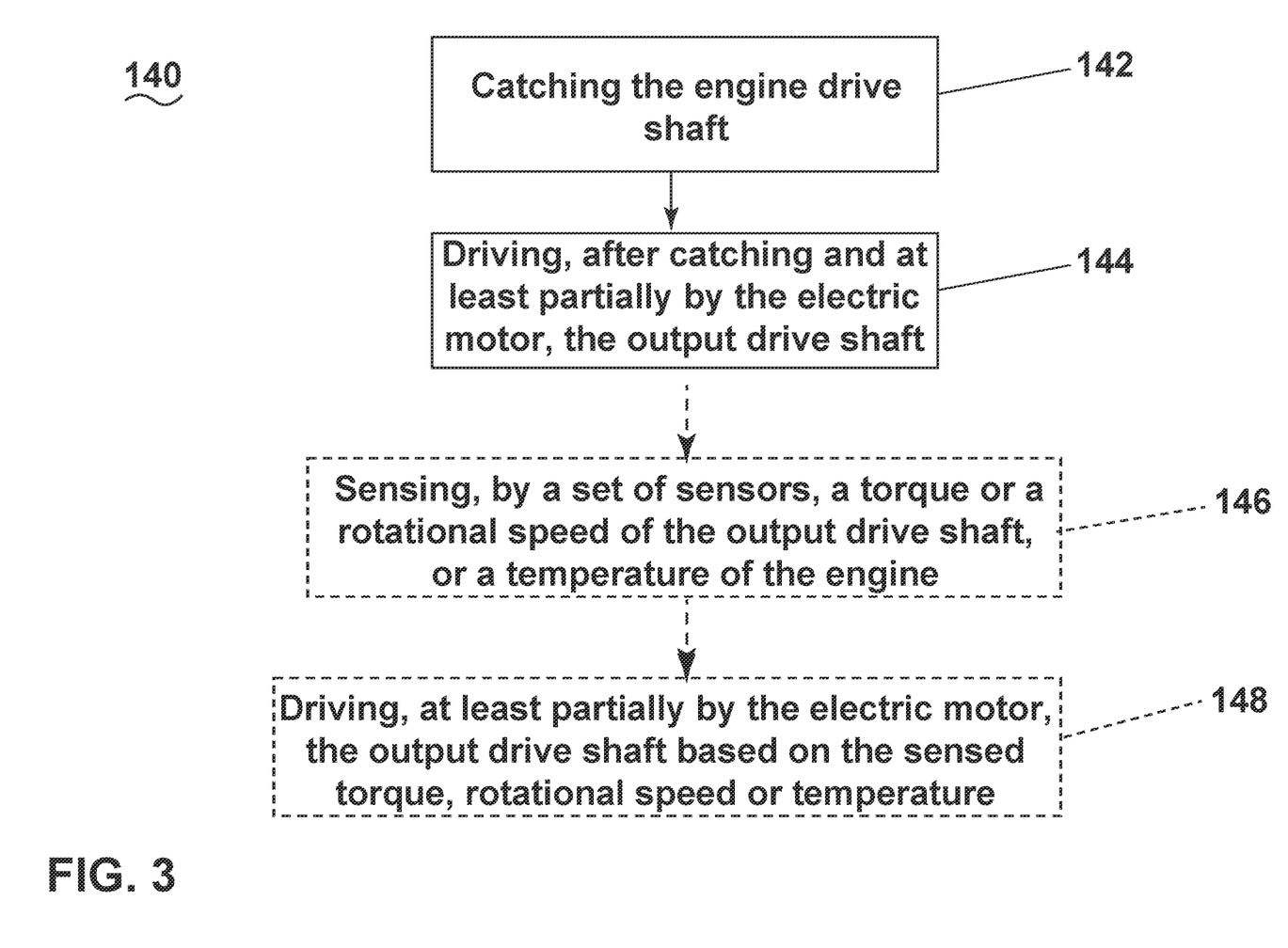
FIG. 3 is a method of operating a turbine engine including the engine starter assembly of FIG. 2.

FIG. 3 is a method 140 of operating the engine 114 including the engine starter assembly 100 of FIG. 2. Reference will be made to FIGS. 2 and 3 by relating the method 140 to the physical aspects of the engine starter assembly 100 of FIG. 2. The method 140 describes an intended operation of the engine starter assembly 100.

The method 140 can include catching, through a rotation of the output drive shaft 112, the engine drive shaft 115 of the engine 114 after shutdown of the engine 114, at 142. As used herein, the term "catching" or iterations thereof refers to the coupling of a first rotatable component to a second rotatable component while the first rotatable component is still rotating. As a non-limiting example, shutdown, the engine drive shaft 115 will continue to rotate and coast down to zero RPMs (e.g., the engine drive shaft 115 has stopped rotating). However, the output drive shaft 112 is coupled to the engine drive shaft 115, thus catching the engine drive shaft 115 via the output drive shaft 112, at 142, preventing the engine drive shaft 115 from coasting down to zero. As used herein, shutdown of the engine 114 refers to a time when combustion has ceased or when a source of power (e.g., fuel, combustion, heat, etc.) is no longer supplied to the engine 114. The electric motor 116 can at least partially drive the engine 114 by catching the engine drive shaft 115, at 142, with the output drive shaft 112 before the engine drive shaft 115 completely stops. It will be appreciated that the engine drive shaft 115 can be rotating at any suitable non-zero rotational speed when the engine drive shaft 115 is caught, at 142. As a non-limiting example, the engine drive shaft 115 can be rotating at greater than or equal to 500 RPM and less than or equal to 1000 RPM when the engine drive shaft 115 is caught, at 142. The engine drive shaft 115 can be caught through any suitable method such as, but not limited to, a coupling of the engine drive shaft 115 to the output drive shaft 112 at the coupling point 117 or an engagement of the first clutch 120 and/or the second clutch 122.

After the engine drive shaft 115 is caught, at 142, the method 140 can include driving, at least partially by the electric motor 116, the engine drive shaft 115 through the output drive shaft 112, at 144. It will be appreciated that the electric motor 116 can be used to control the rotation of the engine drive shaft 115 and increase, decrease, or maintain a rotation of the engine drive shaft 115 without requiring startup or combustion of the engine 114.

The method can include additional steps illustrated in dashed, phantom lines of the method 140. As a non-limiting example, the method 140 can include sensing, by the set of sensors 134, at least one of a torque or a rotational speed of the output drive shaft 112, or a temperature of the engine 114, at 146. The method 140 can further include driving, at least partially by the electric motor 116, the output drive shaft 112 based on the sensed torque, rotational speed, and/or the temperature, at 148. As a non-limiting example, the method 140 can include driving, at least partially by the electric motor 116, the output drive shaft 112 based on the rotational speed or torque of the output drive shaft 112 to ensure that the rotational speed or torque of the drive shaft is at a desired value to effectively coast down or otherwise control the engine 114 after shutdown of the engine 114. As a non-limiting example, the method 140 can include driving, at least partially by the electric motor 116, the output drive shaft 112 based on the temperature of the engine 114 such that the driving of the output drive shaft 112 is used to supply a flow of cooling fluid to the engine 114 to cool at least a portion of the engine 114 until, for example, the sensed temperature of the engine 114 is within a desired threshold. As a non-limiting example, supplying the flow of cooling fluid can be done by driving, by the electric motor 116, the engine drive shaft 115 such that the fan section 16 (FIG. 1) rotates and draws in an ambient air into the engine 114, thus effectively cooling the engine 114. As a non-limiting example, the supplying the flow of cooling fluid can be done by supplying a cooling fluid to the engine through the ATS 102. The coasting down of the engine 114 by catching, at 142, and driving, at 144, has been found to aide in the shutdown process of the engine 114. For example, by continuing to drive, at 144, the engine drive shaft 115, the engine 114 can be effectively cooled after shutdown of the engine 114. The cooling after shutdown of the engine 114 ensures that the engine 114 is brought to a suitable temperature where it can sit idle for an extended period of time and reduces the time that the engine 114 is sitting idle at high temperatures. Further, the catching, at 142, and driving, at 144, allows for the engine drive shaft 115 to continue to rotate without combustion within the engine 114. As a non-limiting example, if it is desired to continue cooling the engine 114, the electric motor 116 can drive the engine drive shaft 115 and hold the engine drive shaft 115 at a desired speed until cooling is finished.

The driving, at 144, can be used for other purposes other than cooling. As a non-limiting example, the driving, at 144, can be done during maintenance of the engine 114 or the engine starter assembly 100. As a non-limiting example, the electric motor 116 can be used to drive at least a portion of the engine starter assembly 100 or the engine 114 such that someone performing maintenance of the engine starter assembly 100 or the engine 114 can simulate and otherwise observe how the engine starter assembly 100 or the engine 114 functions. As a non-limiting example, a user performing maintenance can simulate a function of the engine 114 through use of the electric motor 116 to determine if anything in the engine 114 is not operating as intended. This can be done without the need to startup (e.g., produce combustion) the engine 114.

Figure 4:
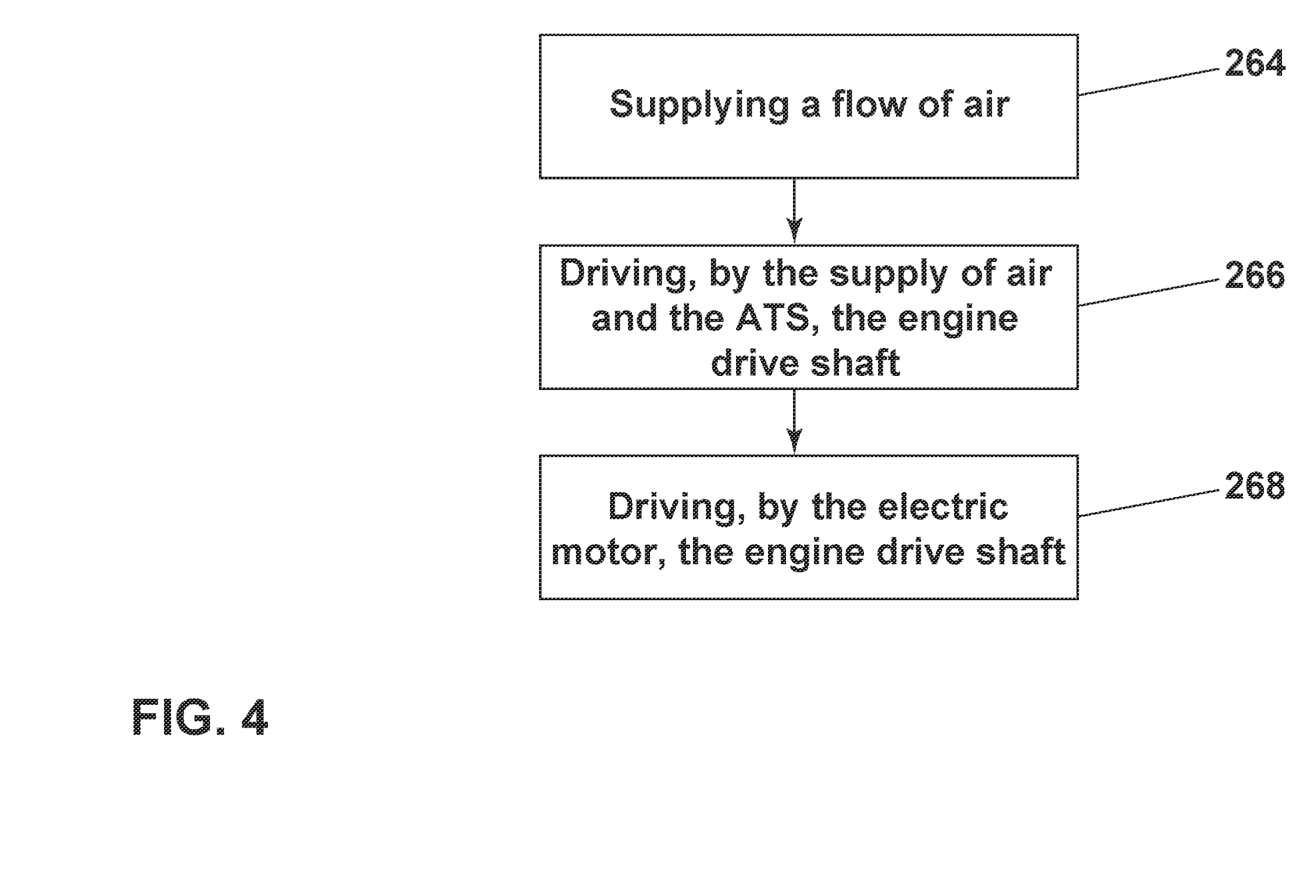
FIG. 4 is a method of starting a turbine engine including the engine starter assembly of FIG. 2.

FIG. 4 is a method 260 of operating the engine 114 including the engine starter assembly 100 of FIG. 2. Reference will be made to FIGS. 2 and 3 by relating the method 260 to the physical aspects of the engine starter assembly 100 of FIG. 2. The method 260 describes an intended operation of the engine starter assembly 100.

The method 260 can include starting the engine 114. The starting of the engine 114 can be done through a series of events. The starting of the engine 114 can first be done by supplying, by the SAV 124, a flow of air to the ATS 102, at 264. With the flow of air, the ATS 102, specifically turbine member 106 of the ATS 102, can rotate which results in the driving, at least partially by the ATS 102 the output drive shaft 112, and hence the engine drive shaft 115, at 264. The starting of the engine 114 can further be done by driving, by the electric motor 116, the engine drive shaft 115, at 268. The electric motor 116 can physically drive the electric motor output shaft 118, which can be couplable to or integrally formed with the output drive shaft 112, hence the driving of the electric motor output shaft 118, via the electric motor 116, can drive the output drive shaft 112. This operation of driving the output drive shaft 112 through both the ATS 102 and the electric motor 116 can be used to the start the engine 114.

The reliance on both the ATS 102 and the electric motor 116 during startup of the engine 114 can be used to create a more reliable, more efficient and smoother startup of the engine 114. For example, in some instances where only the ATS 102 is used during startup of the engine 114, the air supplied to the ATS 102 through the SAV 124 may be insufficient to generate a torque through the output drive shaft 112 high enough to start the engine 114. The use of the electric motor 116 can ensure that that the torque and rotational speed of the output drive shaft 112 is always sufficient to start the engine 114. This, in turn, also results in the startup process of the engine 114 being more efficient and smoother as the use of both the ATS 102 and the electric motor 116 eliminates the possibility of a failed start.

It will be understood that the methods 140, 260 are flexible. For example, the sequence of steps depicted is for illustrative purposes only, and is not meant to limit the methods 140, 260 in any way, as it is understood that the steps can proceed in a different logical order or additional or intervening steps can be included without detracting from embodiments of the invention. As a non-limiting example, at least a portion of the methods 140, 260 can occur in tandem with or offset from one another.

As a non-limiting example, steps of the methods 140, 260 can be done automatically through commands from the controller module 128. As a non-limiting example, the driving, at 144, can be done through a command sent to the electric motor 116, the first clutch 120 or the second clutch 122 from the controller module 128. As a non-limiting example, the sensed torque, rotational speed, or temperature can be communicated to the controller module 128, and the controller module 128 can use this sensed information to subsequently drive the electric motor, at 148. As a non-limiting example, one or more of the steps of starting the engine 114, can be done through the controller module 128.

As a non-limiting example, the method 260 can include continuously supplying the flow of air to the ATS 102, at 264, such that the ATS 102 is continuously driving the output drive shaft 112 during startup of the engine 114. As a non-limiting example, the method 260 can include selectively driving, by the electric motor 116, the engine drive shaft 115, at 268. In other words, the electric motor 116 can be selectively driven based on the needed and sensed torque or rotational speed of the output drive shaft 112. As a non-limiting example, if it is determined that the rotational speed or torque of the output drive shaft 112 should be higher, the electric motor 116 can be turned on or otherwise coupled to the output drive shaft to help increase the rotational speed or torque of the output drive shaft 112 unit the rotational speed or torque is at a desired or needed value.

It will be appreciated that the electric motor 116 can be used to augment the engine starter assembly 100 to ultimately cause the output drive shaft 112 to rotate with a desired torque or at a desired rotational speed. As a non-limiting example, the electric motor 116 can speed up the output drive shaft 112 by providing an input through the electric motor output shaft 118 that would ultimately add to the output of the output drive shaft 112 if the output drive shaft 112 were operated without the electric motor 116 input. As a non-limiting example, the electric motor 116 can slow down the output drive shaft 112 by providing an input through the electric motor output shaft 118 that would ultimately subtract from or otherwise operate counter to the output of the output drive shaft 112 if the output drive shaft 112 were operated without the electric motor 116 input. The electric motor 116 can be used for varied purposes during differing operational states of the engine 114.

Benefits associated with the present disclosure include an engine starter assembly with increased control over the output when compared to a conventional engine starter assembly. For example, the conventional engine starter assembly can include an ATS coupled to an output drive shaft. A flow of air is fed to the ATS, which drives the output drive shaft. It is difficult, however, to control the torque or the rotational speed of the output drive shaft solely through the supply of air to the ATS. The engine starter assembly as described herein, however, includes the ATS and the electric motor, which, together or separately, can rotate the output drive shaft. The electric motor allows for additional control over the torque and rotational speed of the output drive shaft by slowing down or speeding up the output drive shaft. This, in turn, ensures that the torque and the rotational speed of the output drive shaft is always at a desired value for an intended operation of the engine starter assembly. As such, the engine starter assembly, as described herein, has an increased control over the output of the output drive shaft when compared to the conventional engine starter assembly.

Additional benefits of the present disclosure include an increased cooling efficiency of the engine when compared to a conventional engine. For example, the conventional engine can require off-board system to cool the conventional engine after shutdown of the conventional engine. The engine, as described herein, however, can utilize the electric motor to supply a flow of cooling fluid to the engine core and thus cool the engine core. This greatly increases the cooling efficiency of the engine when compared to the conventional engine.

Additional benefits of the present disclosure include a decreased burden of maintenance of the engine or engine starter assembly when compared to the conventional engine starter assembly or a conventional engine. For example, maintenance of the conventional engine starter assembly or the conventional engine can require disassembling the conventional engine starter assembly or the conventional engine and visually inspecting various components of the conventional engine starter assembly or the conventional engine to try to determine if any portion of the conventional engine starter assembly or the conventional engine needs maintenance. The engine starter assembly, as described herein, however, can utilize the electric motor to drive the engine starter assembly or the engine such that a user performing maintenance can simulate a function of the engine starter assembly or the engine and easily determine which portions of the engine starter assembly or the engine are functionally properly or improperly. In other words, the electric motor can be used to provide a visual representation of the operation of the engine starter assembly or the engine to a person performing maintenance, thus greatly reducing the burden of maintenance when compared to the conventional engine starter assembly or the conventional engine.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising an engine core having a compression section, combustion section, and turbine section in serial flow arrangement, the engine core having an engine drive shaft, and an engine starter assembly having an output drive shaft selectively coupled to the engine drive shaft, the engine starter assembly further comprising an air turbine starter (ATS) operably coupled to the output drive shaft, the ATS being selectively coupled to a supply of air through a starter air valve (SAV), and an electric motor operably coupled to at least one of the ATS or the output drive shaft, and a set of sensors operably coupled to the output drive shaft, the set of sensors measuring at least one of a rotational speed or torque of the output drive shaft, with at least one of the electric motor or the SAV being operated based on the measurements from the set of sensors.

A method of operating a turbine engine having an engine drive shaft and an engine starter assembly with an air turbine starter (ATS) and an electric motor, the engine starter assembly being operably coupled to the engine drive shaft through an output drive shaft, the method comprising starting the turbine engine by supplying a flow of air to the ATS, driving, by the supplying of air to the ATS, the engine drive shaft through the output drive shaft, and driving, by the electric motor, the engine drive shaft through the output drive shaft.

A method of operating a turbine engine having an engine drive shaft and an engine starter assembly with an air turbine starter (ATS) and an electric motor, the engine starter assembly being operably coupled to the engine drive shaft through an output drive shaft, the method comprising catching, through a rotation of the output drive shaft, the engine drive shaft after shutdown of the turbine engine, and driving, after catching the output drive shaft and at least partially by the electric motor, the engine drive shaft through the output drive shaft by coupling the electric motor to at least one of the output drive shaft or the ATS.

The turbine engine of any preceding clause, wherein the electric motor comprises an electric motor rotor and an electric motor stator, with the electric motor rotor operably coupled to the output drive shaft.

The turbine engine of any preceding clause, wherein the electric motor rotor is directly coupled to the output drive shaft.

The turbine engine of any preceding clause, wherein the ATS and the electric motor are provided outside of the engine core.

The turbine engine of any preceding clause, further comprising a clutch selectively coupling the electric motor to at least one of the ATS or the output drive shaft.

The turbine engine of any preceding clause, further comprising a controller module selectively, operably controlling the operation of the ATS and the electric motor to control at least one of a rotational speed or a torque of the output drive shaft.

The turbine engine of any preceding clause, wherein the set of sensors provide an input including the measurements to the controller module, and the controller module controls at least one of the SAV or the electric motor based on the input.

The turbine engine of any preceding clause, wherein the set of sensors includes at least one sensor that is operably coupled to the engine core, the at least one sensor providing an input to the engine starter assembly indicative of a temperature of the engine core, and the electric motor at least partially drives the output drive shaft to supply a flow of cooling fluid to the engine core based on the input from the at least one sensor.

The turbine engine of any preceding clause, further comprising a fan section, with the flow of cooling fluid being an ambient air drawn in from the fan section.

The turbine engine of any preceding clause, wherein the engine starter assembly is provided exterior the engine core.

The turbine engine of any preceding clause, further comprising an accessory gear box selectively, operably coupling the ATS to the engine drive shaft.

The method of any preceding clause, further comprising sensing, by a set of sensors operably coupled to the output drive shaft or to a respective portion of the turbine engine, at least one of a torque or a rotational speed of the output drive shaft, or at least one temperature of the turbine engine.

The method of any preceding clause, further comprising driving, after catching the output drive shaft and at least partially by the electric motor, the output drive based at last partially on the sensed torque, rotational speed or temperature.

The method of any preceding clause, further comprising driving, after catching the engine drive shaft and in response to the sensed temperature of the turbine engine and at least partially by the electric motor, the output drive shaft after shutdown of the turbine engine.

The method of any preceding clause, further comprising supplying, after catching the engine drive shaft and by the driving of the output drive shaft, a cooling fluid to at least a portion of the turbine engine until the sensed temperature is within a threshold temperature value.

The method of any preceding clause, further comprising driving, at least partially by the electric motor, the output drive shaft by selectively coupling, through a clutch, the output drive shaft or the ATS to the electric motor.

The method of any preceding clause, further comprising controlling, by a controller module, an output of the electric motor.

The method of any preceding clause, further comprising starting the turbine engine by continuously supplying, during startup of the turbine engine, the flow of air to the ATS, continuously driving, during startup of the turbine engine and by the supplying of air to the ATS, the engine drive shaft through the output drive shaft, and selectively driving, by the electric motor, the engine drive shaft through the output drive shaft.

The method of any preceding clause, further comprising driving, at least partially by the electric motor, the output drive shaft by selectively coupling, through a clutch, the output drive shaft or the ATS to the electric motor.

The method of any preceding clause, further comprising controlling, by a controller module, an output of the electric motor.

What is claimed is:

1. A method of operating an engine starter assembly for a turbine engine, the engine starter assembly including an output drive shaft selectively couplable to an engine drive shaft, an air turbine starter (ATS) operably coupled with the output drive shaft and selectively coupled with a supply of air through a starter air valve (SAV), and an electrical motor selectively coupled to the ATS and configured to drive at least a portion of the ATS and the output drive shaft, the method comprising:
    catching, through a rotation of the output drive shaft, the engine drive shaft after shutdown of the turbine engine; and
    driving, after catching the output drive shaft and at least partially by the electric motor, the engine drive shaft through the output drive shaft until a sensed temperature of the turbine engine is within a temperature threshold.

2. The method of claim 1, further comprising sensing, by a set of sensors operably coupled to the output drive shaft or to a respective portion of the turbine engine, at least one of a torque or a rotational speed of the output drive shaft, or the sensed temperature of the turbine engine.

3. The method of claim 1, further comprising supplying, after catching the engine drive shaft and by the driving of the output drive shaft, a cooling fluid to at least a portion of the turbine engine until the sensed temperature is within the temperature threshold.

4. The method of claim 1, wherein the catching the engine drive shaft includes catching the engine drive shaft while the engine drive shaft is rotating at a speed greater than or equal to 500 RPM and less than or equal to 1000 RPM.

5. The method of claim 4, wherein driving the engine drive shaft includes maintaining the speed of the engine drive shaft at the speed at least partially by the electric motor.

6. A method of operating a turbine engine comprising an engine core, an engine drive shaft, and an engine starter assembly including an output drive shaft selectively coupled to the engine drive shaft, an air turbine starter (ATS) operable coupled with the output drive shaft and selectively coupled with a supply of air through a starter air valve (SAV), and an electrical motor coupled to the ATS and configured to drive at least a portion of the ATS and the output drive shaft, the method comprising:
    starting the turbine engine by:
        supplying a flow of air to the ATS;
        driving, by the supplying the flow of air to the ATS, the engine drive shaft through the output drive shaft; and
        supplementing the ATS via driving, by the electric motor, the engine drive shaft through the output drive shaft such that the engine drive shaft is driven via the ATS and the electric motor simultaneously.

7. The method of claim 6, wherein a controller module controls operation of the ATS and the electric motor to control at least one of a rotational speed or a torque of the output drive shaft.

8. The method of claim 7, wherein the controller module controls at least one of the SAV or the electric motor based on an input from a set of sensors.

9. The method of claim 6, further comprising: providing, via at least one sensor, an input to the engine starter assembly indicative of a temperature of the engine core, and
driving the electric motor to at least partially drive the output drive shaft to supply a flow of cooling fluid to the engine core based on the input from the at least one sensor.

10. The method of claim 9, wherein the turbine engine further comprises a fan section, with the flow of cooling fluid being an ambient air drawn in from the fan section.

11. The method of claim 6, further comprising:
shutting down the turbine engine; and
driving, after shutting down the turbine engine and at least partially by the electric motor, the engine drive shaft through the output drive shaft until a sensed temperature of the turbine engine is within a threshold temperature value.

12. The method of claim 11, further comprising supplying, after shutting down the turbine engine, a cooling fluid to at least a portion of the turbine engine.

13. The method of claim 11, further comprising supplying, after shutting down the turbine engine, a cooling fluid to at least a portion of the turbine engine through the ATS.

14. The method of claim 6, further comprising determining, prior to supplementing the ATS, that the flow of air to the ATS is insufficient to generate a torque through the output drive shaft to start the turbine engine.

15. The method of claim 6, wherein supplying the flow of air to the ATS includes continuously supplying the flow of air to the ATS such that the ATS is continuously driving the output drive shaft during starting up of the turbine engine.

16. The method of claim 6, further comprising controlling the electric motor to increase or decrease speed or torque of the output drive shaft.

17. The method of claim 6, further comprising coupling the ATS to the output drive shaft through a first clutch;
coupling the electric motor with a turbine drive shaft of the ATS through a second clutch; and
coupling the output drive shaft with the engine drive shaft via a third clutch.

18. The method of claim 6, wherein supplementing the ATS includes the electric motor rotating a turbine drive shaft of the ATS; and
wherein a turbine member comprising a set of airfoils is coupled to and rotates with the turbine drive shaft.

19. An engine starter assembly for a turbine engine having an engine core having a compression section, combustion section, and turbine section in serial flow arrangement, the engine core having an engine drive shaft, the engine starter assembly comprising:
an output drive shaft selectively coupled to the engine drive shaft;
an air turbine starter (ATS) operably coupled to the output drive shaft, the ATS being selectively coupled to a supply of air through a starter air valve (SAV);
an electric motor coupled to the ATS and being configured to drive at least a portion of the ATS and the output drive shaft;
a temperature sensor to measure a temperature of the turbine engine; and
a controller to, after shutdown of the turbine engine, operate the electric motor to drive the engine drive shaft through the output drive shaft until the temperature of the turbine engine is within a temperature threshold.

20. The engine starter assembly of claim 19, wherein the controller is configured to control, at least in part, starting the turbine engine by:
operating the SAV to provide air from the supply of air to the ATS to drive the engine drive shaft through the output drive shaft; and
operating the electric motor to drive the engine drive shaft through the output drive shaft such that the engine drive shaft is driven via the ATS and the electric motor simultaneously.

* * * * *